(12) United States Patent
Roussel

(10) Patent No.: US 7,152,916 B2
(45) Date of Patent: Dec. 26, 2006

(54) LINER FOR A MOTOR VEHICLE GRILLE

(75) Inventor: Thierry Roussel, Fayl la Foret (FR)

(73) Assignee: Compagnie Plastic Omnium, Lyons (FR)

( * ) Notice: Subject to any disclaimer, the term of this patent is extended or adjusted under 35 U.S.C. 154(b) by 0 days.

(21) Appl. No.: 11/030,716

(22) Filed: Feb. 2, 2005

(65) Prior Publication Data
US 2005/0253420 A1    Nov. 17, 2005

(30) Foreign Application Priority Data
Feb. 3, 2004    (FR) .................................. 04 01019

(51) Int. Cl.
B62D 25/08    (2006.01)
(52) U.S. Cl. ................................ 296/203.02
(58) Field of Classification Search ........... 296/203.02, 296/193.1, 187.03, 187.04, 187.09, 193.09, 296/39.1; 293/115, 154, 155
See application file for complete search history.

(56) References Cited

U.S. PATENT DOCUMENTS

| | | | |
|---|---|---|---|
| 4,406,489 A * | 9/1983 | Trabert .................. | 293/115 |
| 5,403,048 A | 4/1995 | Ekladyous | |
| 5,478,127 A * | 12/1995 | Chase .................. | 293/115 |
| 6,659,220 B1 * | 12/2003 | Kobayashi .............. | 180/68.6 |
| 6,886,872 B1 * | 5/2005 | Matsumoto et al. ..... | 293/115 |
| 2003/0042055 A1 | 3/2003 | Suwa | |
| 2004/0124643 A1 * | 7/2004 | Matsumoto et al. ..... | 293/115 |
| 2005/0006928 A1 * | 1/2005 | Diehl et al. ............ | 296/193.1 |

FOREIGN PATENT DOCUMENTS

| | | | | |
|---|---|---|---|---|
| DE | 4238725 | * | 5/1994 | ............. 293/115 |
| FR | 2 783 766 A | | 3/2000 | |
| JP | 05069784 | * | 3/1993 | ............. 293/115 |
| JP | 5213125 | * | 8/1993 | ............. 293/115 |
| JP | 6219224 | * | 8/1994 | ............. 293/115 |
| JP | 6219225 | * | 8/1994 | ............. 293/115 |
| JP | 09 226625 A | | 9/1997 | |
| WO | WO 03/024747 A | | 3/2003 | |

* cited by examiner

Primary Examiner—H Gutman
(74) Attorney, Agent, or Firm—James R. Williams

(57) ABSTRACT

The invention relates to a liner for the grille of a motor vehicle. The liner permits simple management of the desired clearance between a bumper shield and grille. The liner is intended to position the grille relative to the bumper shield while simultaneously supporting a top rim of the bumper shield.

15 Claims, 1 Drawing Sheet

LINER FOR A MOTOR VEHICLE GRILLE

FIELD OF THE INVENTION

The present invention relates to a liner for a motor vehicle grille.

BACKGROUND OF THE INVENTION

One of the present preoccupations in the motor vehicle industry lies in managing the various clearances between bodywork parts in order to optimize the appearance of the vehicle and the functional effectiveness of said bodywork parts.

The inventors working on the present invention have found that the clearance between a bumper shield and a motor vehicle grille cannot be managed in simple manner.

SUMMARY OF THE INVENTION

A particular object of the invention is to overcome that problem.

To this end, the invention provides a liner for a grille, the liner being positioned above a bumper shield, said shield having a top rim, the liner being characterized in that it includes means for supporting the top rim of the shield.

Since this grill liner is intended to position the grille, the fact that it is used to support the shield makes it simple to manage the clearance between the shield and the grille.

Optionally, the means for supporting the top rim of the shield form a transverse beam constituting a bearing surface level with the femur of a pedestrian's leg when the liner is mounted on a vehicle. Thus, in the event of an impact against a pedestrian, a leg of the pedestrian pressing against the top rim of the shield is not subjected to potentially dangerous deformation.

A grille liner of the invention may further comprise one or more of the following characteristics:

the means for supporting the top rim of the shield comprise a bottom shelf extending over the entire length of the grille and providing a support surface for the top rim of the shield; and the bottom shelf includes at least one longitudinal reinforcing rib extending substantially perpendicularly to said bottom shelf.

Furthermore, the grille liner of the invention is optionally of a general shape that fits substantially to the inside shape of the grille, so as to stiffen the grille so as to avoid small deformations in response to weak forces being applied to the grille.

According to other optional characteristics:

the liner includes fastener means for fastening to the vehicle;

the fastener means for fastening on the vehicle are means for fastening to a front panel of the vehicle;

the means for fastening to the front panel are suitable for breaking in the event of the liner being subjected to a force greater than a predetermined force, corresponding to a Danner impact;

the liner is concave in shape and is shaped in such a manner as to be capable of flattening in the event of being subjected to a force greater than a predetermined force, corresponding to a Danner impact;

in its bottom portion the liner includes bearing ends for bearing against the front panel and shaped so as to escape downwards or sideways so as to preserve the front panel and/or members mounted thereon, such as a radiator, in the event of the liner being subjected to a force greater than a predetermined force, corresponding to a Danner impact;

the bearing ends are shaped to escape downwards or sideways in such a manner that a horizontal force exerted on said bearing ends causes them to tilt in a desired direction; and each of the bearing ends is of chamfered shape.

These characteristics have the advantage of conferring protection on the front panel which, in the event of a Danner impact, is not damaged by the grille and its support being pushed in.

According to other optional characteristics:

the liner includes localized energy-absorber means on the liner suitable for being level with the higher part of a pedestrian's leg or the head of a child when said liner is mounted on a vehicle; and the energy-absorber means comprise an array of ribs.

These characteristics have the advantage of protecting a pedestrian in the event of a pedestrian impact.

Finally, according to a last optional characteristic, the grille liner is made of thermoplastic material.

The invention will be better understood on reading the following description given purely by way of example and made with reference to the accompanying drawings, in which:

DETAILED DESCRIPTION OF THE INVENTION

Figure 1:
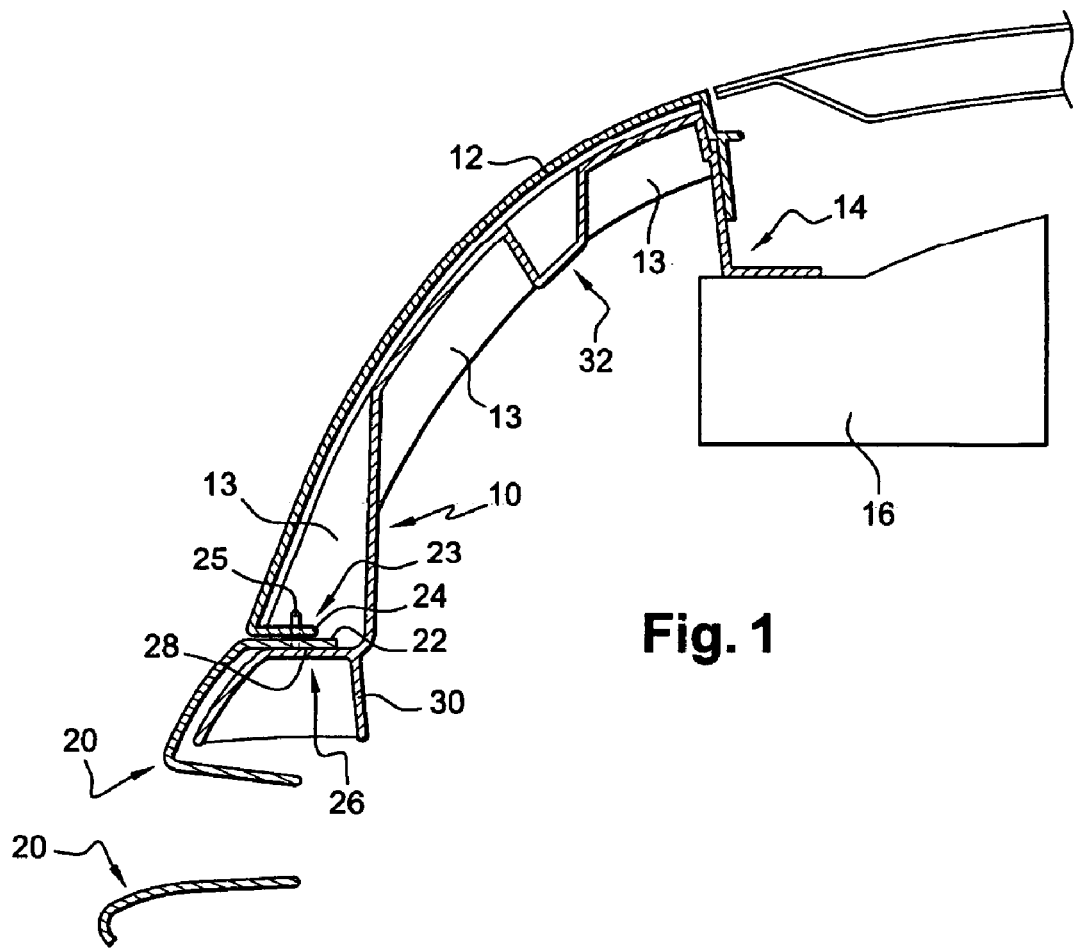
FIG. 1 is a longitudinal section view of a grille liner of the invention, mounted on a motor vehicle.

FIG. 1 shows a liner 10 for a motor vehicle grille 12.

The liner 10 is generally made of thermoplastic material and comprises reinforcing ribs 13 serving to stiffen it, and means 14 for fastening to a vehicle. In the embodiment described, the vehicle has a front panel 16, and the means 14 for fastening to the vehicle are means for being fastened to said front panel 16.

The vehicle also includes a bumper shield 20. The shield 20 is provided with a top rim 22 including means 23 for fastening the grille 12 to the bumper shield 20. The bottom edge of the grille 12 is provided with horizontally-movable snap-fastener tabs 24 and the fastener means 23 include orifices formed on projections 25 from the top rim 22, suitable for receiving the tabs 24 on snap-fastening.

The liner 10 is also designed to be positioned above the bumper shield 20, and it has means 26 for supporting the top rim 22.

Figure 2:
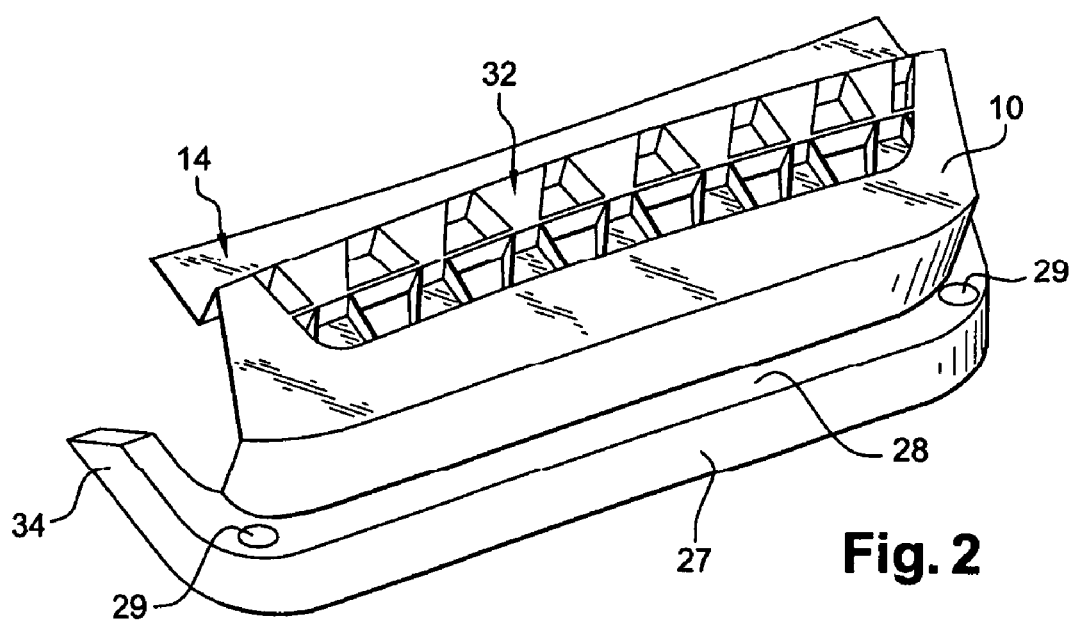
FIG. 2 is a perspective view of the FIG. 1 grille liner.

In general, the means 26 for supporting the top rim 22 form a transverse beam 27, as can be seen in FIG. 2. This beam 27 has a bottom shelf 28 extending over the full length of the grille 12 and providing a support surface for the top rim 22 of the shield 20. Thus, the top rim 22 of the shield 20 is held against the bottom edge of the grille 12.

In order to be reinforced, in particular in a vertical direction, the bottom shelf 28 includes at least one longitudinal reinforcing rib 30 extending substantially perpendicularly to said bottom shelf 28.

In addition, the shield 20 is secured to the bottom shelf 28 at two fastening points 29 by means of two screws.

It should be observed that the liner 10 makes it simple to manage the clearance between the shield 20 and the grille 12. Both of the shield 20 and the grille 12 are carried by the liner 10.

In addition to managing the positioning of the shield 20 relative to the grille 12, the liner 10 can also perform several other functions.

Thus, the liner 10 also performs the function of reinforcing the grille 12. For this purpose, the liner 10 is of a shape that fits generally closely to the inside shape of the grille 12. This stiffens the grille 12 and serves to prevent possible deformation of the grille 12 resulting from weak forces being applied thereto.

In addition, the liner 10 is made in such a manner as to provide protection for a pedestrian in the event of a pedestrian impact. For this purpose, the transverse beam 27 is situated level with the femur of a pedestrian's leg so as to press against the femur in the event of a pedestrian impact. The pedestrian's leg thus bears against the front of the vehicle during a pedestrian impact in such a manner as to avoid suffering potentially dangerous deformation.

The liner 10 also has energy-absorber means 32, e.g. comprising an array of ribs. These energy-absorber means 32 are located level with the higher part of a pedestrian's leg or with the head of a child when the liner 10 is mounted on a vehicle.

Furthermore, the liner 10 is made in such a manner as to protect the front panel 16 in the event of a Danner impact.

For this purpose, it should be observed that the fastener means 14 for fastening the liner 10 to the front panel 16 are suitable for breaking in the event of said liner 10 being subjected to a force greater than a predetermined force that corresponds to a Danner impact. The energy corresponding to the Danner impact is thus not transmitted to the front panel 16 by the fastener means 14.

In addition, the liner 10 is concave in shape, and it is shaped in such a manner as to be suitable for flattening on being subjected to a force corresponding to a Danner impact.

Finally, in its bottom portion the liner 10 has ends 34 for bearing against the front panel 16. Both of these bearing ends 34 are chamfered in shape so as to be capable of tilting upwards or sideways in order to escape when a horizontal force is exerted on said bearing ends 34, e.g. during a Danner impact. The front panel 16 is thus spared during a Danner impact.

The invention claimed is:

1. A liner for a vehicle having:
   a grille including an inside shape, and
   a bumper shield comprising a top rim, wherein
   the liner is intended to position the grille with respect to the bumper shield,
   the liner is positioned above the bumper shield,
   the liner includes supporting means for supporting the top rim of the shield, and
   the liner is shaped to fit substantially closely to an inside shape of the grille.

2. The liner of claim 1, wherein the supporting means includes a transverse beam defining a bearing surface that, when mounted on the vehicle, is level with an upper leg of a pedestrian.

3. The liner of claim 1, wherein the liner includes a fastener for fastening the liner to the vehicle.

4. The liner of claim 3, wherein the fastener fastens to a front panel of the vehicle, and the liner includes a bottom portion comprising a plurality of bearing ends for bearing against the front panel, the bearing ends shaped so as to escape in a direction consisting of downwards and sideways, thereby preserving the front panel when the liner is subjected to a force greater than a predetermined force corresponding to a Danner impact impact, that is, an impact with a fixed wall at 15 km/h.

5. The liner of claim 4, wherein the bearing ends are shaped so that a horizontal force exerted on the bearing ends causes the bearing ends to tilt in a desired direction.

6. The liner of claim 5, wherein the bearing ends include a chamfered shape.

7. The liner of claim 1, wherein the liner is concave in shape and flattens when subjected to a force greater than a predetermined threshold corresponding to a Danner impact impact, that is, an impact with a fixed wall at 15 km/h.

8. The liner of claim 1, wherein the liner includes a localized energy-absorber that, when the liner is mounted on the vehicle, is level with an upper leg of a pedestrian.

9. The liner of claim 8, wherein the energy-absorber comprises an array of ribs.

10. The liner of claim 1, wherein the liner comprises a thermoplastic material.

11. A liner for a grille of a vehicle having a bumper shield comprising a top rim, the liner being positioned above the bumper shield and including supporting means for supporting the top rim of the shield, the supporting means comprising a bottom shelf, extending over an entire length of the grille, constituting a support surface for the top rim of the shield.

12. The liner of claim 11, wherein the bottom shelf includes at least one longitudinal reinforcing rib extending substantially perpendicularly to the bottom shelf.

13. The liner of claim 11, wherein the grille includes an inside shape and the liner comprises a shape that fits substantially closely to the inside shape of the grille.

14. A liner for a grille of a vehicle having a bumper shield comprising a top rim, the liner being positioned above the bumper shield, and comprising supporting means for supporting the top rim of the shield and a fastener for fastening the liner to the vehicle, the fastener fastening to a front panel of the vehicle.

15. The liner of claim 14, wherein the fastener is suitable for breaking when the liner is subjected to a force greater than a predetermined force corresponding to a Danner impact, that is, an impact with a fixed wall at 15 km/h.

* * * * *